(12) United States Patent
Swann et al.

(10) Patent No.: US 6,227,597 B1
(45) Date of Patent: May 8, 2001

(54) VEHICLE SEAT WITH LIMITED REARWARD MOVEMENT

(75) Inventors: Timothy A. Swann, Mesa; Jess A. Cuevas, Scottsdale; Ahmad L. Al-Amin, Higley; Bryan W. Shirk; Roy D. Van Wynsberghe, both of Mesa, all of AZ (US); Daniel R. Sutherland, Eastpointe; Paul A. Bowers, Ray, both of MI (US)

(73) Assignees: TRW Inc.; TRW Vehicle Safety Systems Inc., both of Lyndhurst, OH (US)

( * ) Notice: Subject to any disclaimer, the term of this patent is extended or adjusted under 35 U.S.C. 154(b) by 0 days.

(21) Appl. No.: 09/405,957

(22) Filed: Sep. 27, 1999

(51) Int. Cl.$^7$ ...................................................... B60N 2/42
(52) U.S. Cl. ..................................... 296/68.1; 297/216.18
(58) Field of Search ...................... 296/68.1; 297/216.18, 297/216.19, 216.16, 216.1

(56) References Cited

U.S. PATENT DOCUMENTS

| | | |
|---|---|---|
| 2,900,036 | 8/1959 | Blake . |
| 3,992,046 | 11/1976 | Braess .................................. 296/68.1 |
| 5,167,421 | 12/1992 | Yunzhao .......................... 296/68.1 X |
| 5,344,204 | 9/1994 | Liu ........................................ 296/68.1 |
| 5,947,543 | * 9/1999 | Hubbard .............................. 296/68.1 |

* cited by examiner

Primary Examiner—Joseph D. Pape
(74) Attorney, Agent, or Firm—Tarolli, Sundheim, Covell, Tummino & Szabo L.L.P.

(57) ABSTRACT

An apparatus (10) includes seat (11) for a vehicle occupant (15) and a support (20) for the seat (11). The seat (11) has a forward position in a vehicle (12) and a rearward position in the vehicle (12). The support (20) enables the seat (11) to move, relative to the support (20), from the forward position to the rearward position in the vehicle (12) during a frontal vehicle collision (13). The seat (11) moves from the forward position to the rearward position due to a force transmitted to the seat (11) through the legs (16) of the vehicle occupant (15).

17 Claims, 3 Drawing Sheets

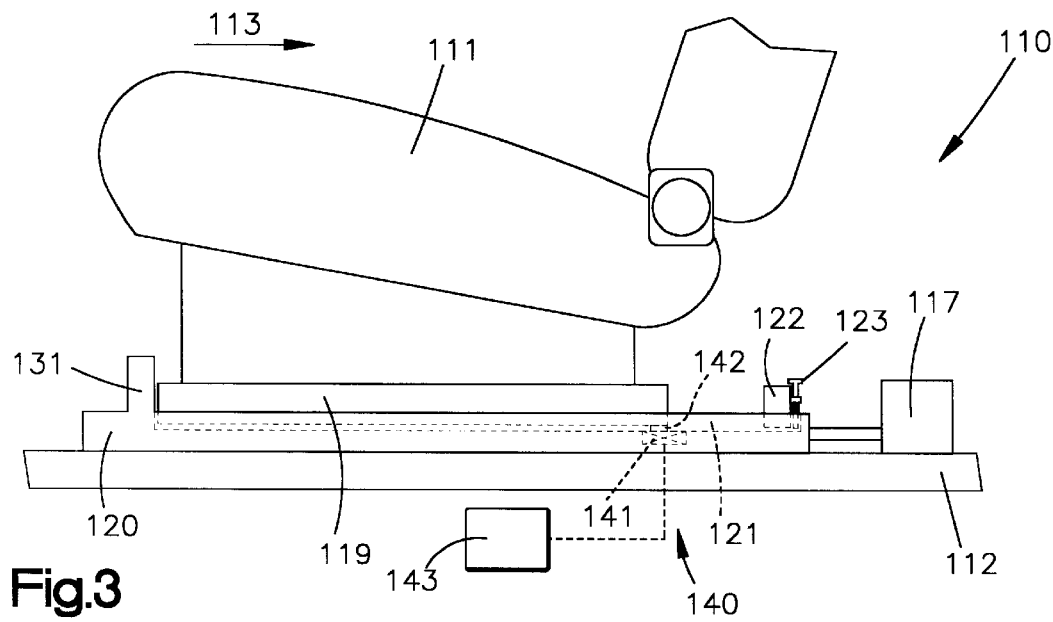
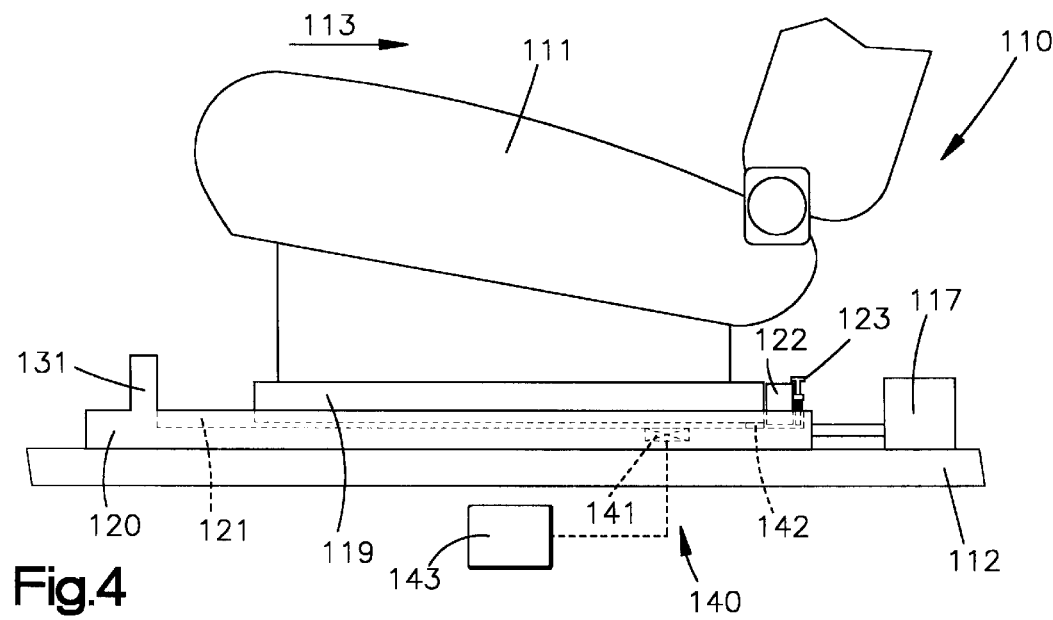

VEHICLE SEAT WITH LIMITED REARWARD MOVEMENT

FIELD OF THE INVENTION

This invention relates to a vehicle occupant safety system and, more particularly, to a vehicle seat that moves to protect a vehicle occupant during a frontal vehicle collision.

BACKGROUND OF THE INVENTION

A variety of restraint systems have been devised for vehicle occupant safety. The most commonly employed systems have belts or harnesses to fasten about vehicle occupants as well as inflatable air bags. These systems have been fairly effective in controlling occupant motion and absorbing the occupant's kinetic energy.

Both upper and lower body safety can be achieved by purely "passive" restraint systems. In this context, "passive" refers to the requirement that the occupant not have any active participation in the deployment or application of the restraint system once the occupant is seated in the vehicle. This is currently achieved by using automatically applied seat belts and automatically actuated air bags and knee bolsters. One such passive restraint system includes is an air bag to protect the upper torso and head and a knee bolster to provide lower torso restraint.

SUMMARY OF THE INVENTION

In accordance with the present invention, an apparatus includes a seat for a vehicle occupant and a support for the seat. The seat has a forward position in a vehicle and a rearward position in the vehicle. The support enables the seat to move relative to the support from the forward position to the rearward position in the vehicle during a frontal vehicle collision. The seat moves from the forward position to the rearward position due to a force transmitted to the seat through the legs of the vehicle occupant.

In accordance with a first embodiment of the present invention, the apparatus includes a spring for biasing the seat toward the forward position. The force from the legs of the vehicle occupant during a frontal collision overcomes the biasing force of the spring to move the seat to the rearward position.

In accordance with a second embodiment of the present invention, the apparatus includes a stop and an actuator. The stop has a blocking position for preventing rearward movement of the seat relative to the support. The actuator moves the stop from the blocking position and enables the seat to move to the rearward position. The force from the legs of the vehicle occupant during a frontal collision moves the seat to the rearward position.

BRIEF DESCRIPTION OF THE DRAWINGS

The foregoing and other features of the present invention will become apparent to one skilled in the art upon reading the following description of the invention with reference to the accompanying drawings, in which:

FIG. 3 is a schematic view of a second embodiment of an apparatus embodying the present invention and illustrating a seat in one position;

FIG. 4 is a schematic view of the apparatus of FIG. 3 illustrating the seat in a different position.

DESCRIPTION OF THE PREFERRED EMBODIMENT

Figure 1:
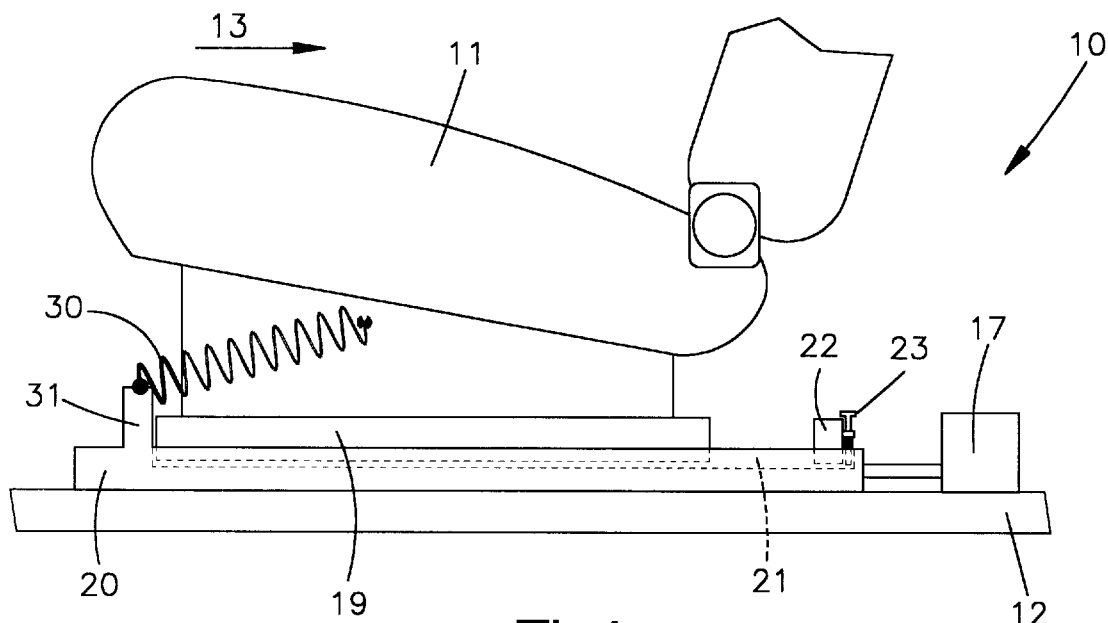
FIG. 1 is a schematic view of a first embodiment of an apparatus embodying the present invention and illustrating a seat in one position.
Figure 2:
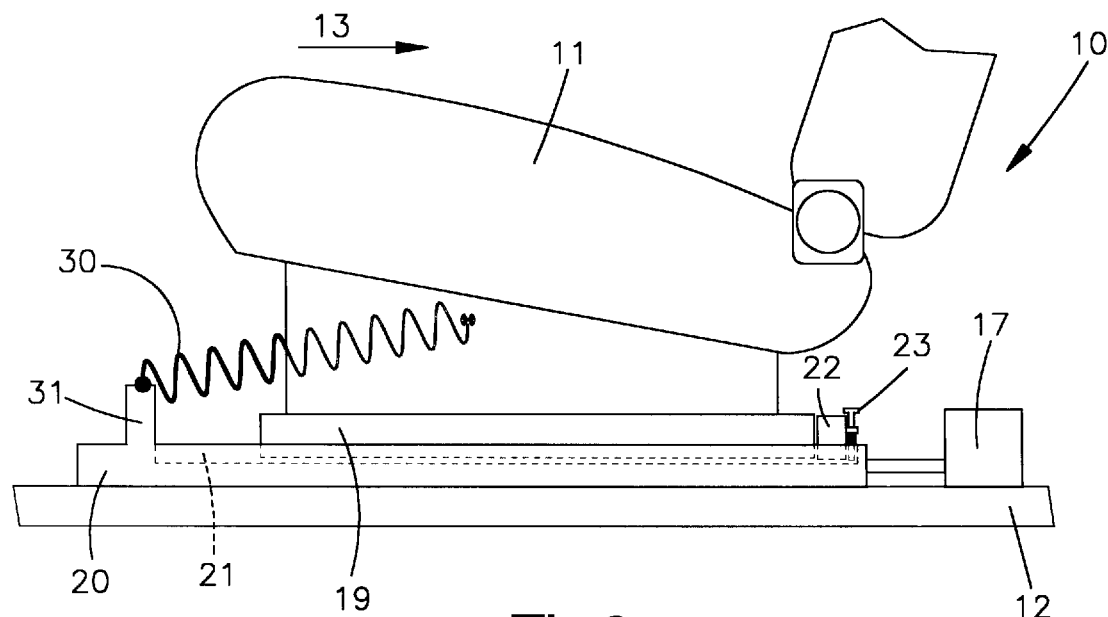
FIG. 2 is a schematic view of the apparatus of FIG. 1 illustrating the seat in a different position.
Figure 5:
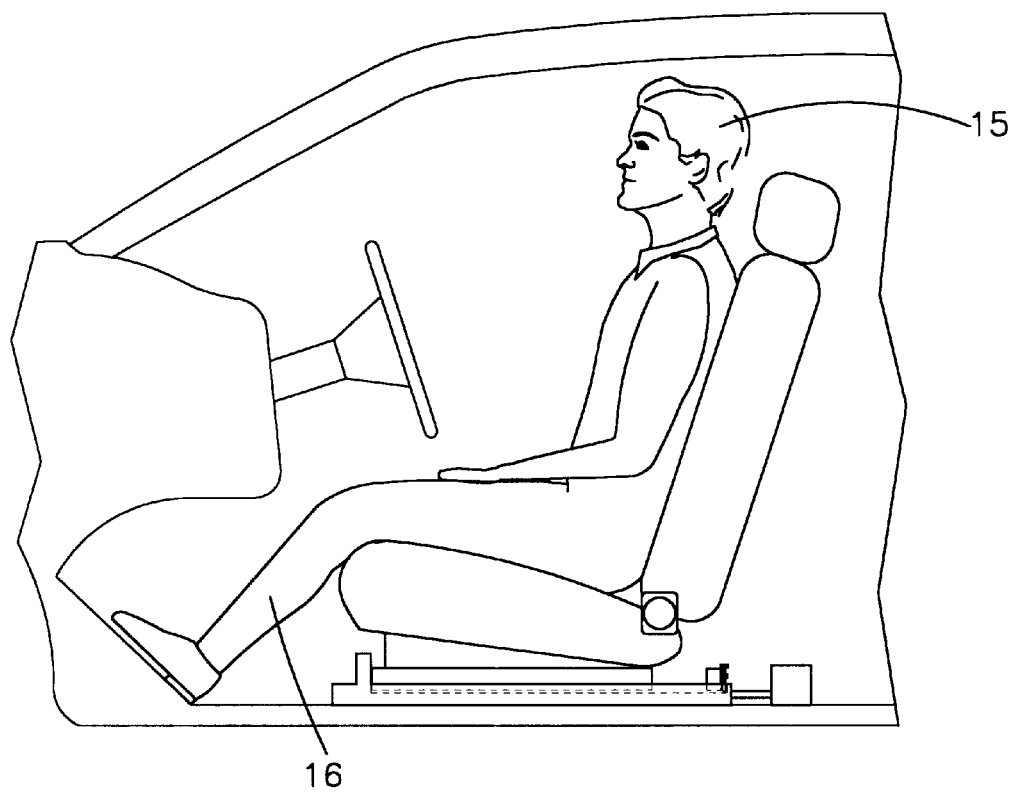
FIG. 5 is a schematic view of a vehicle occupant seated in a vehicle seat.

In accordance with a first embodiment of the present invention, as viewed in FIGS. 1 and 2, an apparatus 10 includes a seat 11 for the occupant 15 (FIG. 5) of a vehicle 12 and a support 20 for the seat 11. The seat 11 has rail members 19 (only one is shown). The rail members 19 slidingly engage the support 20 and slide relative to the support 20 in the direction of arrow 13 (FIG. 1).

The seat 11 has a forward position (FIG. 1) in the vehicle 12 and a rearward position (FIG. 2) in the vehicle 12. The seat 11 and rail members 19 move from the forward position to the rearward position in the vehicle 12 during a frontal vehicle collision.

The support 20 is attached to the vehicle 12 and includes two guide tracks 21 (only one is shown), which engage the rails 19. The rails 19 slide from the forward position to the rearward position on the guide tracks 21.

A spring 30 biases the seat 11 toward the forward position against a fixed forward stop 31 on the support 20. During a frontal collision, the vehicle occupant 15 presses very hard on the floor of the vehicle 12. This pressing transmits a force into the legs 16 of the vehicle occupant 15. The force from the legs 16 of the vehicle occupant 15 overcomes the biasing force of the spring 30 to stretch the spring 30 and move the seat 11 to the rearward position. The seat 11 moves from the forward position to the rearward position due to the force transmitted to the seat 11 through the legs 16 of the vehicle occupant 15.

During a frontal collision, the legs of the vehicle occupant 15 can be subjected to substantial loads and possibly trapped by a combination of vehicle deceleration and cabin intrusion. Specifically, as the vehicle abruptly decelerates, the legs 16 of the vehicle occupant 15 press on the floor of the vehicle 12 with much greater force than normal. If the floor or firewall of the vehicle 12 is deformed into the vehicle cabin as a result of the collision, the force on the occupant's legs 16 will be increased further. This force applied to the legs 16 of the vehicle occupant 15 is transmitted from the occupant to the vehicle seat 11 and overcomes the friction between the rails 19 and the guide tracks 21 to move the seat 11. The seat 11 moves from the forward position to the rearward position. The force transmitted to the seat 11 through the legs 16 of the vehicle occupant 15 allows rearward movement of the occupant 15 and the seat 11 and keeps the legs 16 of the vehicle occupant 15 from being trapped by cabin intrusion.

A rearward stop 22 determines the location of the rearward limit position of the rail members 19 on the support 20. A suitable means 23 for adjusting the location of the rearward stop 22 on the support 20, such as a spring loaded pin or a ratchet mechanism, enables the length of travel of the seat 11 during the collision to be varied.

The travel distance between the forward position and the rearward position is at least 10 millimeters and can be as much as 50 millimeters depending on the vehicle crash dynamics. The rearward stop 22 may be moved within this range for tailoring the movement of the seat to occupants of varying sizes, vehicles of varying sizes, and various crash criteria.

Moreover, the seat 11, rail members 19, and support 20 are adjustably connected to the vehicle 12. A means 17, such as a motor and drive, adjusts the location of the seat 11, rail members 19, and support 20 in the vehicle for occupants of varying heights. The adjustment occurs by actuation of the means 17, which, when actuated, moves the seat 11, rail members 19, and support 20 forward or rearward in the vehicle.

The vehicle 12 may include, in addition to the apparatus 10, other vehicle safety apparatuses, such as air bags, and seat belts (not shown). These other apparatuses may operate in concert with the apparatus 10.

In accordance with a second embodiment of the present invention, as viewed in FIGS. 3 and 4, an apparatus 110 includes a seat 111 for the occupant 15 (FIG. 5) of a vehicle 112 and a support 120 for the seat 111. The seat 111 has rail members 119 (only one is shown). The rail members 119 slidingly engage the support 120 and slide relative to the support 120 in the direction of arrow 113.

The seat 111 has a forward position (FIG. 3) in the vehicle 112 and a rearward position (FIG. 4) in the vehicle 112. The seat 111 and rail members 119 move from the forward position to the rearward position in the vehicle 112 during a frontal vehicle collision.

The support 120 is attached to the vehicle 112 and includes two guide tracks 121 (only one is shown), which engage the rails 119. The rails 119 slide from the forward position to the rearward position on the guide tracks 121.

A stop 140 secures the seat 111 and rail members 119 against a fixed forward stop 131 on the support 120 in a blocking position (FIG. 3). During a frontal collision, an actuator 141 releases the stop 140 from the blocking position. The actuator 141 is typically initiated by a frontal crash sensor 143 for detecting a frontal impact to the vehicle 112 of at least 25 miles per hour. The actuator 141 is typically initiated by a frontal crash sensor 143 for detecting a frontal impact to the vehicle 112 of at least 25 miles per hour. The actuator 141 includes a pyrotechnic charge which releases a shear pin 142 on the stop 140 and allows the seat 111 to travel to the rearward position.

During a frontal collision, the legs 16 of the vehicle occupant 15 can be subjected to substantial loads and possibly trapped by a combination of vehicle deceleration and cabin intrusion. Specifically, as the vehicle abruptly decelerates, the legs 16 of the vehicle occupant 15 press on the floor of the vehicle 112 with much greater force than normal. If the floor or firewall of the vehicle is deformed into the vehicle cabin as a result of the collision, the force on the occupant's legs will be increased further. This force applied to the legs 16 of the vehicle occupant 15 is transmitted from the occupant to the vehicle seat 111 and overcomes the friction between the rails 119 and the guide tracks 121 to move the seat 111. The seat 111 moves from the forward position to the rearward position. The force transmitted to the seat 111 through the legs 16 of the vehicle occupant 15 allows rearward movement of the occupant 15 and the seat 111 and keeps the legs 16 of the vehicle 112 from being trapped by cabin intrusion.

A rearward stop 122 determines the location of the rearward limit position of the rail members 119 on the support 120. A suitable means 123 for adjusting the location of the rearward stop 122 on the support 120, such as a spring loaded pin or a ratchet mechanism, enables the length of travel of the seat 111 during the collision to be varied.

The travel distance between the forward position and the rearward position is at least 10 millimeters and can be as much as 50 millimeters depending on the vehicle crash dynamics. The rearward stop 122 may be moved within this range for tailoring the movement of the seat to occupants of varying sizes, vehicles of varying sizes, and various crash criteria.

Moreover, the seat 111, rail members 119, and support 120 are adjustably connected to the vehicle 112. A means 117, such as a motor and drive, adjusts the location of the seat 111, rail members 119, and support 120 in the vehicle for occupants of varying heights. The adjustment occurs by actuation of the means 117, which, when actuated, moves the seat 111, rail members 119, and support 120 forward or rearward in the vehicle.

The vehicle 112 may include, in addition to the apparatus 110, other vehicle safety apparatuses, such as air bags and seat belts (not shown). These other apparatuses may operate in concert with the apparatus 110.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
    a seat for a vehicle occupant, said seat having a forward position in a vehicle and a rearward position in the vehicle; and
    a support for said seat enabling said seat to move relative to said support from said forward position to said rearward position in the vehicle during a frontal vehicle collision, said seat moving from said forward position to said rearward position due to a force transmitted to said seat through the legs of the vehicle occupant of said seat.

2. The apparatus as defined in claim 1 further including a spring for biasing said seat toward said forward position, said force overcoming the biasing of said spring to move said seat to said rearward position.

3. The apparatus as defined in claim 2 further including a fixed forward stop against which said seat is biased by said spring.

4. The apparatus as defined in claim 1 further including a stop having a blocking position for preventing rearward movement of said seat relative to said support and an actuator for moving said stop from said blocking position and enabling said seat to move to said rearward position.

5. The apparatus as defined in claim 4 wherein said actuator includes a pyrotechnic charge.

6. The apparatus as defined in claim 4 wherein said stop includes a shear pin which fails when subject to a predetermined load.

7. The apparatus as defined in claim 4 further including a frontal crash sensor for initiating said actuator.

8. The apparatus as defined in claim 1 wherein the distance between said forward position and said rearward position is at least 10 millimeters.

9. The apparatus as defined in claim 1 wherein said seat slidably engages said support during said frontal collision.

10. The apparatus as defined in claim 1 wherein said support includes at least one guide track in which said seat slides from said forward position to said rearward position.

11. The apparatus as defined in claim 1 further including a rearward stop for determining said rearward position.

12. The apparatus as defined in claim 11 further including a means for adjusting said rearward stop.

13. The apparatus as defined in claim 1 wherein said apparatus operates in concert with at least one other vehicle safety apparatus.

14. The apparatus as defined in claim 1 further including a mechanism, separate and apart from said actuator, for adjusting the position of said support forwardly and rearwardly in the vehicle for occupants of different heights.

15. An apparatus comprising:

a seat having a first position and a second position; and a support for said seat enabling said seat to move from said first position to said second position during a collision of said apparatus with an object, said seat moving due to a force transmitted from said support to said seat through the legs of an occupant of said seat.

16. The apparatus as defined in claim 15 further including a spring for biasing said seat toward said first position, said force overcoming the biasing of said spring to move said seat to said second position.

17. The apparatus as defined in claim 15 further including a stop having a blocking position for preventing movement of said seat relative to said support and an actuator for moving said stop from said blocking position and enabling said seat to move to said second position.

* * * * *